UNITED STATES PATENT OFFICE.

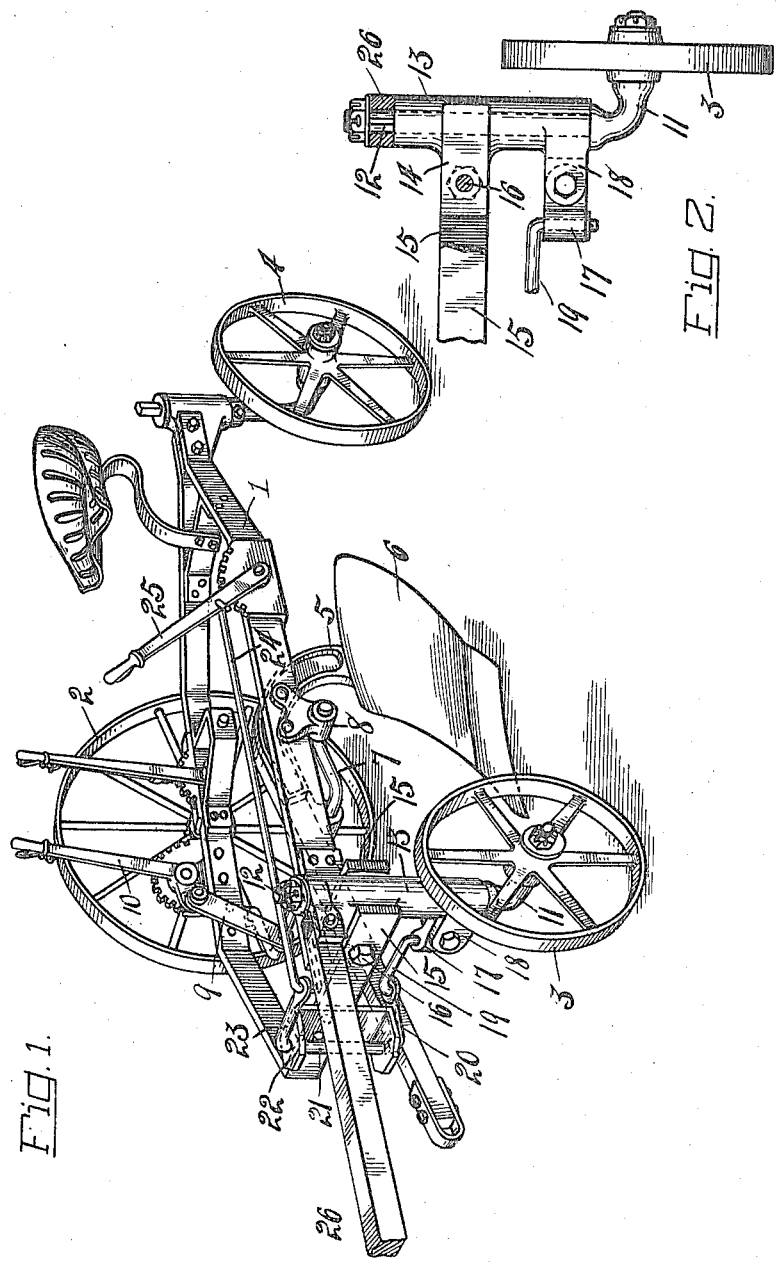

MARTIN A. CORESSEL, OF DEFIANCE, OHIO.

WHEELED PLOW.

1,198,113.  Specification of Letters Patent.  Patented Sept. 12, 1916.

Application filed May 10, 1916. Serial No. 96,506.

*To all whom it may concern:*

Be it known that I, MARTIN A. CORESSEL, a citizen of the United States, and a resident of Defiance, in the county of Defiance and State of Ohio, have invented a certain new and useful Wheeled Plow; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to wheeled plows, and has for its object the provision of improved means for mounting and adjusting the furrow wheel to adapt it to be shifted transverse to the line of travel of the plow to vary the width of cut within predetermined limits.

The invention is fully described in the following specification, and while, in its broader aspect, it is capable of embodiment in numerous forms, a preferred embodiment thereof is illustrated in the accompanying drawings, in which—

Figure 1 is a perspective view of a plow embodying my invention, and Fig. 2 is an enlarged detail of a portion of the means comprising the invention, with parts broken away.

Referring to the drawings, 1 designates the plow frame, which is carried by the land-wheel 2, the furrow-wheel 3 and the trailer or follower-wheel 4, the relative arrangement of which is the same as commonly employed in plows of this type.

5 designates the plow-beam and 6 the plow attached thereto, said beam being pivotally carried by a U-shaped yoke 7, which is journaled for vertical swinging movements in bearings 8 secured to the respective sides of the frame 1. The yoke 7 has connection through the medium of a link 9 with a hand-lever 10, which may be operated to effect a vertical adjustment of the plow with respect to the frame.

The furrow-wheel 3 is loosely mounted on a spindle 11, which projects transversely from the lower end of a vertical shaft 12, which shaft is mounted for horizontal turning movements in a bearing head 13. This head is preferably vertically elongated and is pivoted to the forward end portion of the frame 1 for rocking movement in a vertical plane transversely thereof.

The head 13, in the present instance, extends up between bearing arms 15, 15, which project transversely from the forward end portion of the frame 1, and is pivoted thereto by a bolt 16, which projects through the arms and through a boss or enlargement 14 on the head. A link 17 is pivoted for vertical movements, in the present instance, to ears 18 projecting inward from the lower end portion of the head 13 and has connection through a rod or link member 19 with the rearwardly projecting arm 20 of a bell-crank lever, the shaft 21 of which is vertically mounted in a bearing bracket 22 secured to the forward end of the frame 1. The upper arm 23 of this bell-crank lever extends transversely of the machine and is connected by a rod 24 to a hand-lever 25, which is carried by the frame within convenient reach of the operator when riding on the frame. The lever 25 may be retained in any position of its adjustment in any suitable manner, as is well understood in the art. It is thus evident that a movement of the lever 25 will effect a rocking of the bell-crank lever 20—23 and impart a corresponding inward or outward swinging movement to the bearing head 13, thereby causing an inward or outward adjustment of the furrow-wheel 3 with respect to the line of cut of the plow. The tongue 26 of the machine is fixedly attached at its rear end to the upper end of the furrow-wheel carrying shaft 12 above the head 13 so that the furrow-wheel 3 will follow the turning movements of the tongue with respect to the frame.

With my improved furrow-wheel adjusting means it is possible while plowing to effect an easy and quick transverse adjustment of the furrow-wheel with respect to the plow, which is quite an essential feature in plows of this type. It will be understood that the range of adjustment of the furrow-wheel will depend upon the distance between the furrow-wheel axis and the swinging axis of the head 13 and on the maximum length of the arc in which the head 13 is permitted to swing. In practice the furrow-wheel is adjustable to vary the width of cut from six to nineteen inches, the maximum width of the cut being nineteen inches.

I wish it understood that my invention is not limited to any specific construction, arrangement or form of the parts, except in so far as such limitations are specified in the claims.

Having thus described my invention, what I claim as new, and desire to secure by Letters Patent, is—

1. In a plow of the class described, a frame, a bearing head carried by the forward end portion of said frame for transverse tilting adjustment with respect thereto, a vertical shaft journaled in said bearing head for horizontal turning movements and having its lower end transversely angled to form a spindle, a furrow wheel carried by said spindle, a vertically disposed crank shaft journaled in said frame at one side of said bearing head and having relatively angled crank arms, connection between one of said crank arms and the lower end of said bearing head, a control lever mounted on the rear portion of the frame, and connection between the other of said crank arms and said control lever whereby movements of the control lever will communicate transverse rocking movements to the bearing head, and a tongue fixed to the upper end of said first shaft.

2. In a plow of the class described, a frame having a pair of transversely extending longitudinally spaced parts at its forward end, a bearing head pivoted for vertical rocking movements between said parts and having an arm projecting inwardly from its lower end, a vertically disposed shaft journaled in said bearing head and having its lower end outwardly angled to form a spindle, a furrow wheel carried by said spindle, a tongue fixed to the upper end of said shaft above said bearing head, a control lever carried by the rear portion of said frame and connection between said lever and said bearing head arm operable by movements of the lever to tiltingly adjust said bearing head.

In testimony whereof, I have hereunto signed my name to this specification.

MARTIN A. CORESSEL.

Copies of this patent may be obtained for five cents each, by addressing the "Commissioner of Patents, Washington, D. C."